N. O. ALLYN.
ROTARY ENGINE.
APPLICATION FILED MAR. 6, 1905. RENEWED MAY 28, 1909.

1,028,316. Patented June 4, 1912.

5 SHEETS—SHEET 1.

Witnesses

Inventor
Newell O. Allyn
By
Attorney

N. O. ALLYN.
ROTARY ENGINE.
APPLICATION FILED MAR. 6, 1905. RENEWED MAY 28, 1909.

1,028,316.

Patented June 4, 1912.

5 SHEETS—SHEET 3.

Witnesses

Inventor
Newell O. Allyn
By
Attorney

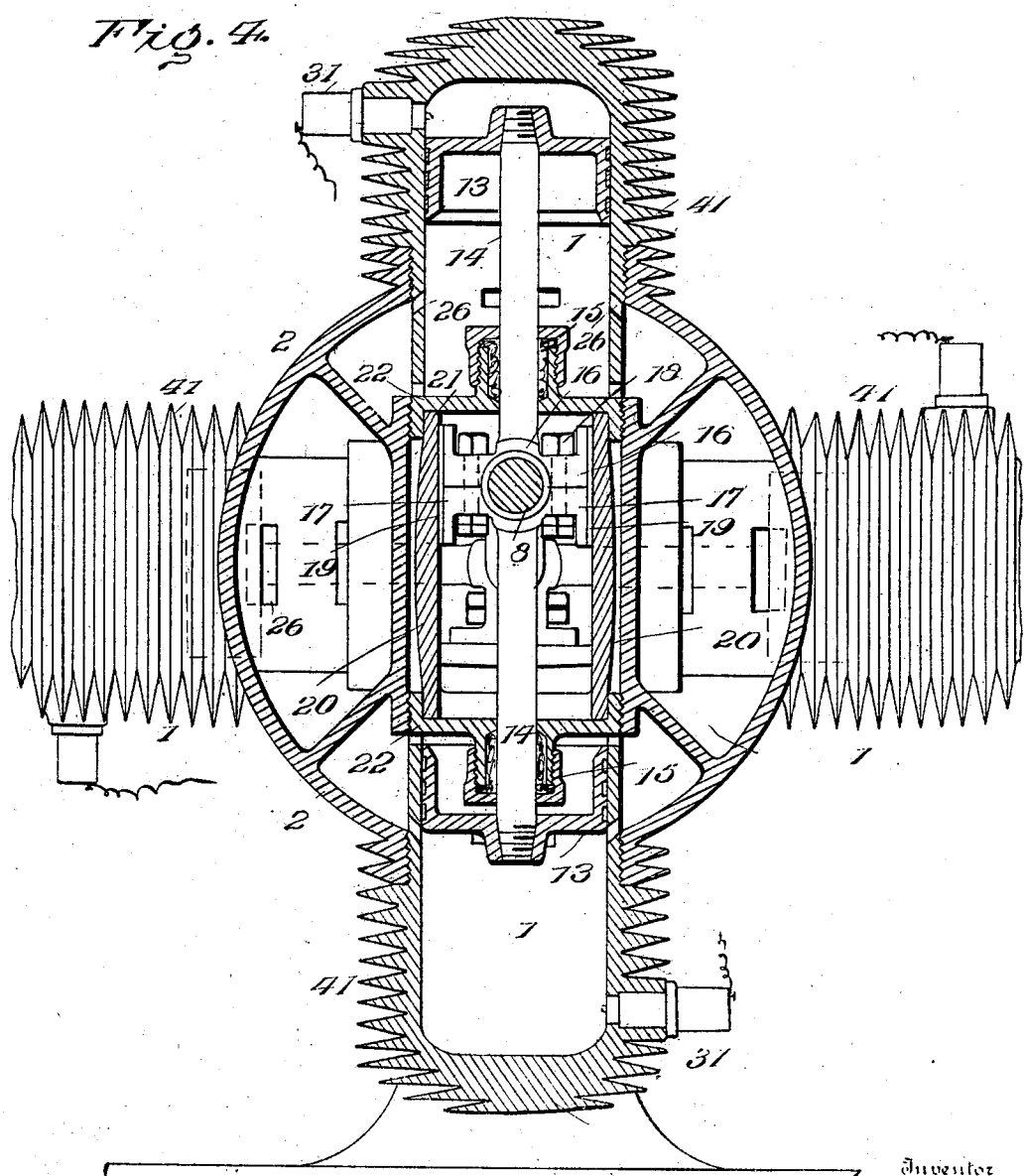

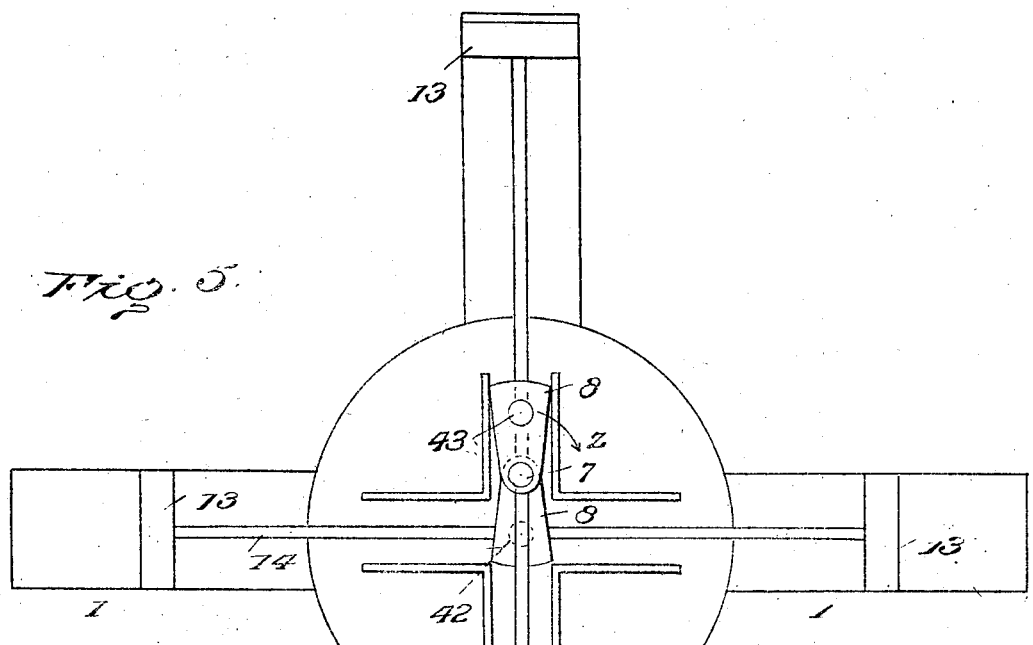
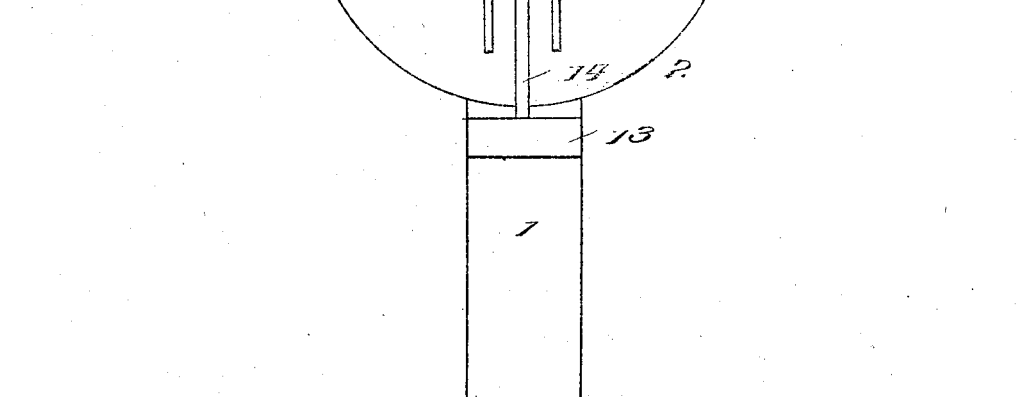

UNITED STATES PATENT OFFICE.

NEWELL O. ALLYN, OF WARREN, OHIO, ASSIGNOR OF ONE-HALF TO GEORGE W. UPTON, OF WARREN, OHIO.

ROTARY ENGINE.

1,028,316.  Specification of Letters Patent.  Patented June 4, 1912.

Application filed March 6, 1905, Serial No. 248,619. Renewed May 28, 1909. Serial No. 498,983.

*To all whom it may concern:*

Be it known that I, NEWELL O. ALLYN, of Warren, in the county of Trumbull and State of Ohio, have invented certain new and useful Improvements in Rotary Engines; and I do hereby declare the following to be a full, clear, and exact description of the invention, such as will enable others skilled in the art to which it appertains to make and use the same.

The primary object of this invention is to construct a rotary explosive engine on the principle of the epicycloidal movement so that the developed power will always be in consonance with the gas-supply, rendering the machine capable of working under variable loads. And further objects are to dispense with the necessity of using trunk pistons, and cross head bearings in the piston-heads; to enable the parts to be readily lubricated; to reduce the wear on the cylinders to a minimum, and to provide improved means for automatically advancing the ignition as the speed of the engine increases.

Briefly stated, my invention contemplates the employment of reciprocating pistons connected to the cranks of a rotating shaft, with and around which they revolve, multiple explosions occurring in each revolution of the engine cylinders, while the shaft makes two revolutions to one of the latter.

The invention will be hereinafter fully set forth and particularly pointed out in the claims.

Figure 1:
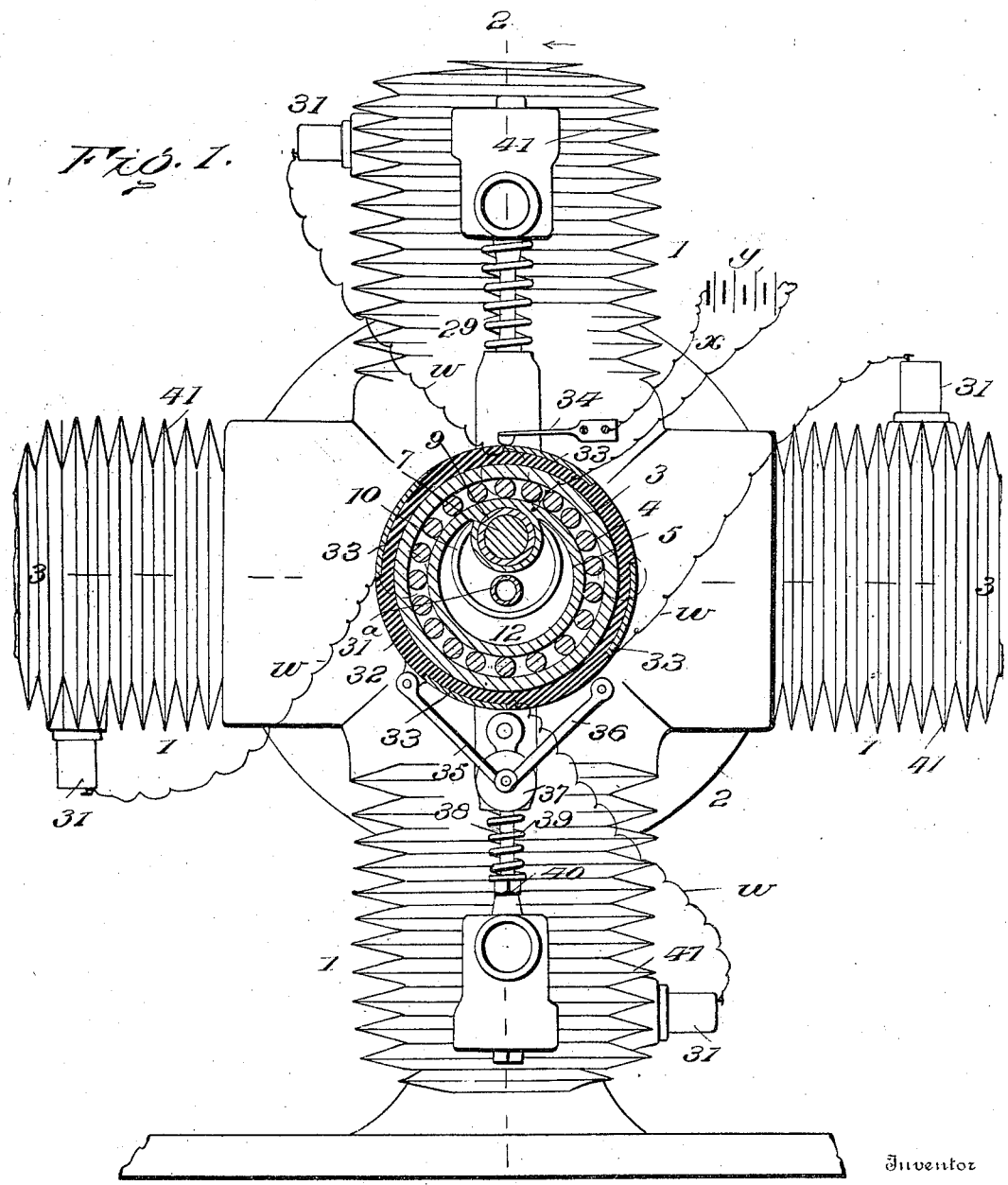
Figure 2:
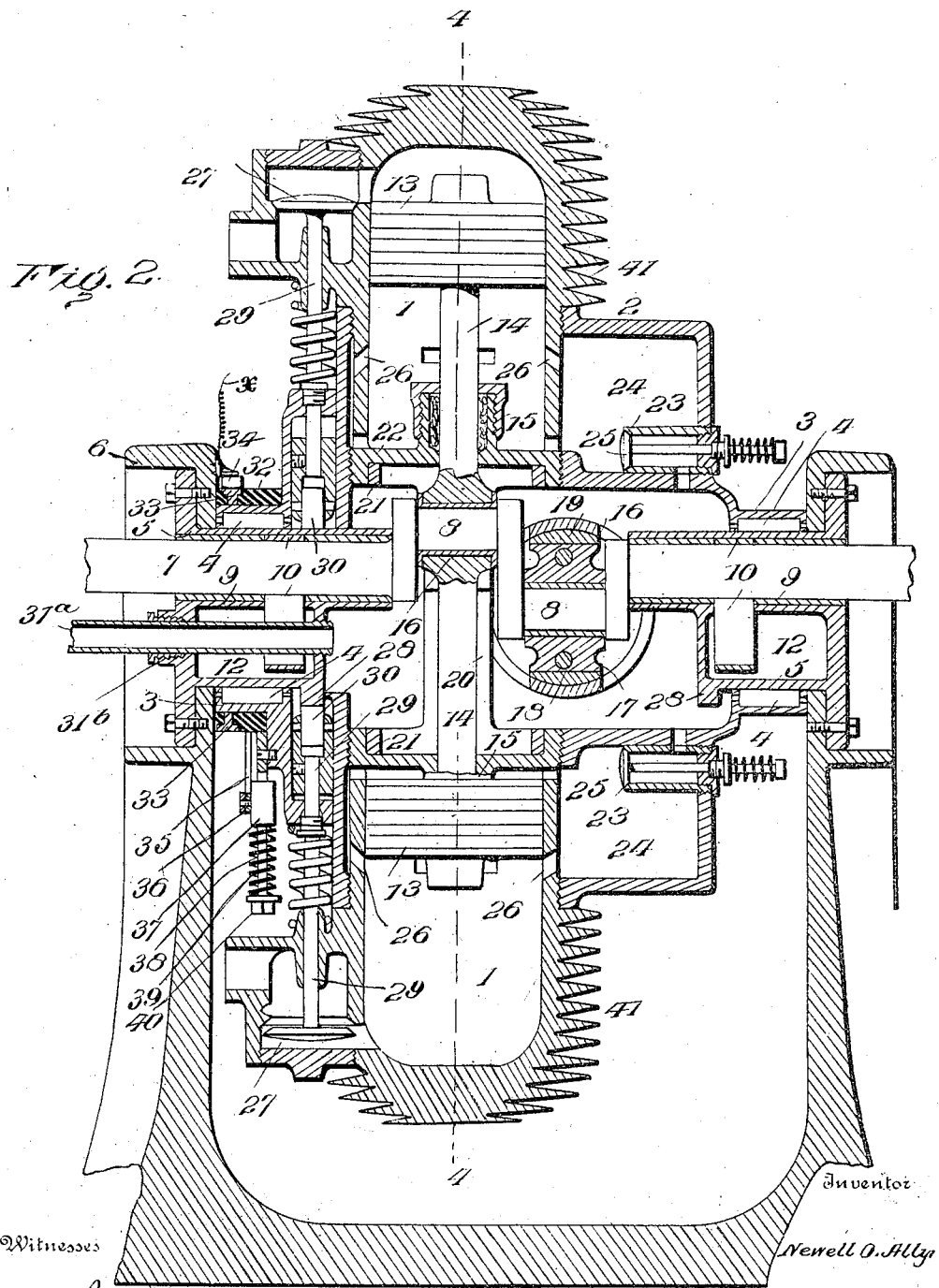
Figure 3:
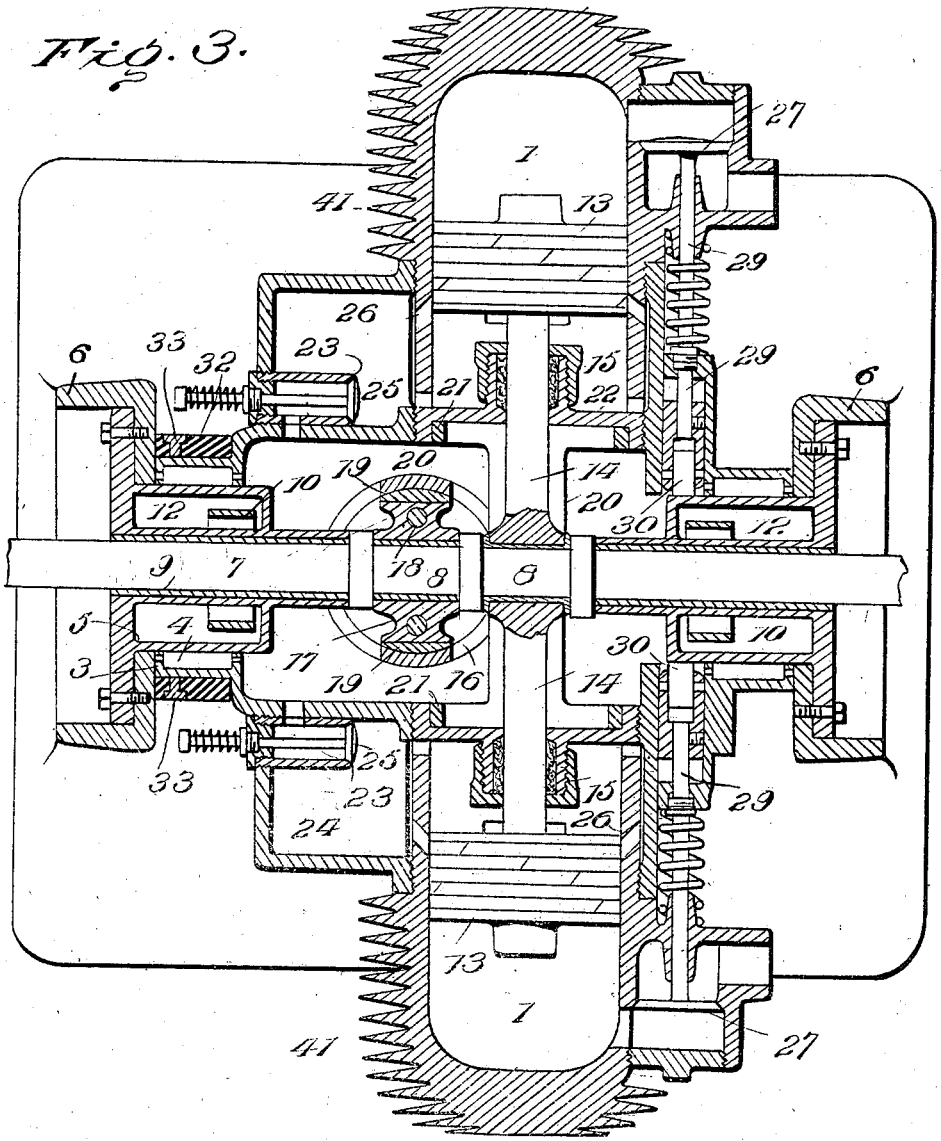

In the accompanying drawings, Figure 1 is a view in side elevation with parts in section and others broken away. Fig. 2 is a vertical sectional view on line 2—2, Fig. 1, looking in the direction of the arrow. Fig. 3 is a horizontal sectional view on line 3—3, Fig. 1. Fig. 4 is a transverse vertical sectional view on line 4—4, Fig. 2. Fig. 5 is a diagrammatic view. Fig. 6 is a detail.

Referring to the drawings, 1 designates a series of four cylinders arranged in pairs, those of each pair being in direct line at opposite points of the engine and to one side of the plane of the cylinders of the other pair. These cylinders at their inner ends are secured to a circular casing 2 having opposite tubular sleeves 3 which revolve on roller bearings 4 around stationary circular sleeves 5 mounted in bearings 6. In eccentrically arranged bores of these sleeves 5 is fitted a rotatable shaft 7 having within the space between the opposite sleeves 5, intermediate the sides of the casing, two cranks 8 extended in opposite directions. Those portions of the shaft in the tubular bores of the sleeves 5 are fitted with sectional bushings 9 between the sections of which are located loose revolving circular bands 10 for supplying lubricant to the shaft from oil-chambers 12 formed in said sleeves, said bands being caused to gradually revolve by frictional engagement with shaft 7.

13 designates the several pistons located within the cylinders, the rod 14 of each piston being secured directly thereto, preferably by screwing into an opening thereof, and passed through a stuffing box 15 into the center of the casing 2. The rods of each pair of pistons are connected together and to the cranks of the rotatable shaft 7 by cross heads 16 formed by equipping the end of one piston rod of each pair with laterally extended, longitudinally arranged wings 17. (See Fig. 4.) The complementary rod of each pair of rods fits against the lateral portions of these wings and is held by nutted bolts 18. These cross-heads are faced with bushings 19 and designed to slide in guideways 20 extending transversely through casing 2, one set of guideways being transverse to the other. These guideways are removable, being formed independently of the casing, and are held in place by rings 21 and plugs 22, the latter being screwed into the casing and forming the inner ends of the piston cylinders. These plugs carry the stuffing-boxes 15 through which the piston rods are passed. The cranks of shaft 7 are so formed relatively that each piston, as its cylinder reaches the highest point in its revolution, attains the outer limit of travel, while at the same time its complementary piston is at the inner limit of its movement. Each crank has a throw of one-fourth the travel of a piston, and being set eccentric to the axis of rotation of the cylinders a distance also equal to one-fourth the travel, each piston is given its full length of travel in each revolution.

The several pistons act on the two-cycle principle. As they travel outwardly the gas charge is drawn through charging openings 23 into compression chambers 24, the admission valves 25 being automatically unseated. The pistons on their return strokes compress the charge within the chambers 24 and in making such return strokes clear the several admission ports 26 leading from the compression chambers into the piston cylinders. These ports 26 are formed at an angle of about 45 degrees, that is, they are shaped toward the outer or explosion ends of the cylinders, so as to facilitate the admission of the compressed gases thereinto. As the gases are entering a cylinder the burned gases are being exhausted therefrom by the unseating of an exhaust-valve 27 by a cam 28 on one of the fixed sleeves 5, the rods 29 of the several exhaust-valves carrying rollers 30 for engaging the cam. Each exhaust valve is unseated when its respective piston has traveled about seven-eighths of its working stroke after an explosion and is held open on the return stroke until the piston passes port 26, thereby allowing nearly all burned gases to escape to the air before the freshly-admitted gases are under compression on the outward movement of the piston. Then the compression begins in the outer ends of the cylinders, and at the same time the pistons on their inner sides are drawing in a fresh charge of the explosive mixture. When the piston reaches the limit of its outer movement the charge is exploded by an electric spark generated from a suitable igniter, conventionally indicated at 31. This occurs in each cylinder in each revolution, and when four cylinders are employed an impulse is obtained at every quarter turn of the engine. The exhaust valves of the two pairs of cylinders are located on opposite sides of the casing.

Any suitable means may be employed for supplying the gases to the casing 2. I have shown in Fig. 2 a pipe 31ª for this purpose, such pipe being passed through a stuffing-box 31ᵇ of one of the trunnions and also through the oil chamber and ring 10 thereof, opening at its inner end into the central chamber of the casing.

I have indicated in Fig. 1 suitable circuit closing means for generating the spark for exploding each charge. It comprehends a ring 32 surrounding one of the casing sleeves 3, and movable therewith, being capable also of being turned axially independently of the casing to advance or retard ignition. Set in the periphery of this ring are contacts 33, one for each cylinder, connected by wires w to the several igniters. These contacts are designed to engage a stationary insulated brush 34, to which is connected one wire x of a battery y. The other pole of the battery is grounded on the engine frame. To provide for automatically advancing the spark as the speed of the engine increases, I connect to the contact-carrying ring 32 one arm 35 of a governor, the other arm 36 thereof being attached direct to the engine casing. The other ends of these arms are pivoted to a weight 37 movable longitudinally of a rod 38 having at its inner end a swiveled connection to the casing. The tension of spring 39 surrounding this rod is controlled by a nut 40, said spring tending to hold the weight in its normal position at the inner end of the rod. In starting, the governor weight being in its normal position the explosions will occur when the cranks are well past their centers, but as the speed of the engine increases the time of ignition is advanced automatically by the action of the governor, the weight whereof under centrifugal action draws the outer ends of the divergent arms closer together to effect the axial turning of the contact-carrying ring. In this way a high rate of speed is automatically acquired and maintained. The several piston cylinders are formed with exterior webs or ribs 41 to aid in the induction of air to carry off the heat of the cylinders, thereby rendering the use of water jackets unnecessary.

It is well known in the art that rotary engines employing fixed crank shafts allow of but such limited angles to the several piston rods when in position for most effectively securing the greatest power under an explosion, that most of the force is expended in acting in lines tending to force the cylinders and the crank shaft apart. If the cranks of these shafts could stand at a greater angle to the pistons then the pressure applied to the latter would give a greater amount of power. In my engine, on the other hand, the crank-shaft instead of being stationary is rotatable. The advantages thereof will be better understood by reference to the diagrammatic showing of Fig. 5. In this figure 42 represents the crank pin for opposite cylinders shown as horizontally disposed, while 43 designates the crank-pin for the vertically-disposed cylinders. It will be seen that the two crank-pins are equi-distant from the eccentrically-arranged crank-shaft 7. Now, for the sake of illustration, let it be supposed that power is applied to the upper of the vertically disposed pistons. This piston will be driven downward, and the fulcrum of its crank being at 7 gives to the crank pin at 42 an upward movement, force being applied against the several guideways in the direction of the arrow z. In this way the longitudinal reciprocations of the pistons are transferred into a rotary action to the casing, cylinders and pistons. Thus it will be seen that there is less wear on the cylinder walls on account of the direct line of movement of the cross-heads in the guideways. Furthermore, no pitman rods are used, nor is it necessary to employ trunk pistons now common in gas-engines, nor to use cross-head bearings in the piston-head. Instead, the several piston rods are secured directly to the pistons and opposite rods are secured together.

Since an explosion occurs at every quarter revolution the necessity of maintaining a high speed to secure sufficient power is obviated. It is obvious that with a given weight the slower the speed the longer the life. Aside from the fact that the use of a fly-wheel is unnecessary, another advantage resides in the avoidance of vibration, rendering the engine especially adaptable to use in motor vehicles and motor boats.

I claim as my invention:—

1. A rotary engine comprising, in combination, a revoluble casing containing a crank chamber, a plurality of cylinders carried by the casing and arranged oppositely in pairs, the pairs being in different transverse planes, a series of independent and detachable compression chambers, one for each cylinder, carried by the casing at the sides of the inner ends of the cylinders, and each having an opening communicating with the crank chamber said pistons in such cylinders being arranged in pairs, rods for said pistons, cross-heads carried by said piston rods to which the latter are rigidly connected, and a rotatable crank shaft upon the cranks of which said cross-heads are mounted, each cylinder having two ports connected with its respective compression chamber, one port being at the inner extremity of the cylinder and the other in position to be uncovered when the piston is at its inward limit of movement, for the escape of the explosive mixture in the outer extremity of the cylinder, said mixture having been compressed in the compression chamber during the inward movement of the piston.

2. A rotary engine comprising, in combination, a revoluble casing, a plurality of cylinders carried by and fastened into the casing and arranged oppositely in pairs, the pairs being in different transverse planes, said pistons in such cylinders being arranged in pairs, rods for said pistons, cross-heads carried by said piston rods to which the latter are rigidly connected, a rotatable crank shaft upon the cranks of which said cross-heads are mounted, and removable guideways in said casing for said cross-heads, said guideways being held in place by the inner ends of the cylinders, which inner ends have stuffing boxes through which said piston rods are passed.

3. A rotary engine comprising, in combination, a revoluble casing, a plurality of cylinders carried by and fastened into the casing and arranged oppositely in pairs, the pairs being in different transverse planes, said pistons in such cylinders being arranged in pairs, rods for said pistons, cross-heads carried by said piston rods to which the latter are rigidly connected, a rotatable crank shaft upon the cranks of which said cross-heads are mounted, removable guideways in said casing for said cross-heads, and screw plugs, forming the inner ends of the piston cylinders, for holding said guideways and having stuffing boxes through which said piston rods are passed.

4. A rotary explosive engine comprising, in combination, a revoluble casing, a plurality of cylinders carried by the casing and arranged oppositely in pairs, the pairs being in different transverse planes, pistons in such cylinders arranged in pairs, rods for said pistons, a rotatable crank shaft to the cranks of which said piston rods are connected, stationary sleeves around which said casing revolves, said sleeves having openings eccentric of the axis of rotation of the casing and wherein said crank shaft fits, said sleeves having oil containing chambers and means operated by the rotation of the shaft and within the oil chamber, for lubricating the shaft.

5. A rotary explosive engine comprising, in combination, a revoluble casing, a plurality of cylinders carried by the casing and arranged oppositely in pairs, the pairs being in different transverse planes, pistons in such cylinders arranged in pairs, rods for said pistons, a rotatable crank shaft to the cranks of which said piston rods are connected, stationary sleeves around which said casing revolves, said sleeves having openings eccentric of the axis of rotation of the casing and wherein said crank shaft fits, said sleeves having oil containing chambers, and loose bands engaging said shaft and extending into said chambers.

In testimony whereof, I have signed this specification in the presence of two subscribing witnesses.

NEWELL O. ALLYN.

Witnesses:
 Geo. W. Upton,
 S. B. Craig.